US010673604B2

(12) United States Patent
Hedin et al.

(10) Patent No.: US 10,673,604 B2
(45) Date of Patent: Jun. 2, 2020

(54) TDD TIMING RECOVERY IN A DISTRIBUTED ANTENNA SYSTEM (71) Applicant: CommScope Technologies LLC, Hickory, NC (US)

(72) Inventors: John M. Hedin, Coon Rapids, MN (US); Scott B. Stratford, Campbell, CA (US)

(73) Assignee: CommScope Technologies LLC, Hickory, NC (US)

(*) Notice: Subject to any disclaimer, the term of this patent is extended or adjusted under 35 U.S.C. 154(b) by 127 days.

(21) Appl. No.: 15/765,712

(22) PCT Filed: Oct. 3, 2016

(86) PCT No.: PCT/US2016/055184
§ 371 (c)(1),
(2) Date: Apr. 3, 2018

(87) PCT Pub. No.: WO2017/059435
PCT Pub. Date: Apr. 6, 2017

(65) Prior Publication Data
US 2018/0302210 A1 Oct. 18, 2018

Related U.S. Application Data (60) Provisional application No. 62/236,870, filed on Oct. 3, 2015.

(51) Int. Cl.
H04L 5/14 (2006.01)
H04B 7/26 (2006.01)
(Continued)

(52) U.S. Cl.
CPC ............ *H04L 5/14* (2013.01); *H04B 7/2656* (2013.01); *H04L 5/1469* (2013.01);
(Continued)

(58) Field of Classification Search
CPC ...... H04L 5/14; H04W 52/143; H04W 52/367
(Continued)

(56) References Cited

U.S. PATENT DOCUMENTS 7,961,689 B2 6/2011 Stratford
8,050,246 B2 11/2011 Wala et al.
(Continued)

FOREIGN PATENT DOCUMENTS

CN 102404761 A 4/2012
CN 102461007 A 5/2012
(Continued)

OTHER PUBLICATIONS

State Intellectual Property Office, P.R. China, "First Office Action from CN Application No. 201680066654.1", from Foreign Counterpart to U.S. Appl. No. 15/765,712, dated Oct. 8, 2019, pp. 1-7, Published: CN.
(Continued)

Primary Examiner — Jae Y Lee
Assistant Examiner — Jean F Voltaire
(74) Attorney, Agent, or Firm — Fogg & Powers LLC (57) ABSTRACT One embodiment is directed to a method (and system and apparatus) for determining timing for a time division duplex (TDD) signal in a distributed antenna system (DAS). The method comprises (and the system and apparatus are configured for) grouping power samples of a downlink portion of the TDD signal into blocks corresponding to a respective time period, comparing power samples of the blocks to a power threshold, assigning the blocks as ON or OFF based on a number of power samples in a respective block that are above the power threshold, identifying a start of a downlink burst in the TDD signal as an ON block preceded by at least
(Continued)

a minimum number of consecutive OFF blocks, and controlling at least one component in the DAS based on the start of the downlink burst.

44 Claims, 4 Drawing Sheets

(51) Int. Cl.
*H04W 56/00* (2009.01)
*H04W 52/14* (2009.01)
*H04W 52/36* (2009.01)
*H04W 88/08* (2009.01)

(52) U.S. Cl.
CPC ....... *H04W 52/143* (2013.01); *H04W 52/367* (2013.01); *H04W 56/008* (2013.01); *H04W 56/0085* (2013.01); *H04W 88/085* (2013.01)

(58) Field of Classification Search
USPC ........................................................ 370/280
See application file for complete search history.

(56) References Cited

U.S. PATENT DOCUMENTS

| | | | |
|---|---|---|---|
| 8,208,414 B2 | 6/2012 | Singh et al. | |
| 8,310,963 B2 | 11/2012 | Singh | |
| 8,385,373 B2 | 2/2013 | Stratford et al. | |
| 8,626,238 B2 | 1/2014 | Stratford et al. | |
| 8,730,848 B2 | 5/2014 | Schmid et al. | |
| 8,830,882 B2 | 9/2014 | Kummetz et al. | |
| 9,219,520 B2 | 12/2015 | Uyehara et al. | |
| 9,219,524 B2 | 12/2015 | Schmid et al. | |
| 9,271,289 B2 | 2/2016 | Schwab et al. | |
| 2005/0254442 A1 | 11/2005 | Proctor, Jr. et al. | |
| 2007/0268846 A1 | 11/2007 | Proctor, Jr. et al. | |
| 2008/0280638 A1* | 11/2008 | Malladi | H04W 52/08 455/522 |
| 2009/0180407 A1 | 7/2009 | Sabat et al. | |
| 2009/0318089 A1 | 12/2009 | Stratford et al. | |
| 2010/0041341 A1 | 2/2010 | Stratford | |
| 2012/0244825 A1 | 9/2012 | Green et al. | |
| 2016/0088623 A1 | 3/2016 | Ben-Shiomo et al. | |
| 2018/0027491 A1* | 1/2018 | Ericson | H04W 52/0206 370/311 |
| 2019/0261292 A1* | 8/2019 | Kummetz | H04B 7/022 |

FOREIGN PATENT DOCUMENTS

| | | |
|---|---|---|
| CN | 103210598 A | 7/2013 |
| WO | 2008076248 A1 | 6/2008 |
| WO | 2014199380 A1 | 12/2014 |
| WO | 2015029021 A1 | 3/2015 |
| WO | 2015063545 A1 | 5/2015 |

OTHER PUBLICATIONS

International Searching Authority, "International Search Report and Written Opinion for PCT Application No. PCT/US2016/055184", dated Jan. 2, 2017, pp. 1-9, Published in: WO.

JMA Wireless TEKO, "TEKO DAS Platform: Part A—Components and Solutions", Teko DAS Platform Technical Handbook, pp. A1-A85; published Jul. 14, 2015.

European Patent Office, "Extended European Search Report from EP Application No. 16852831.3 dated Apr. 29, 2019", from Foreign Counterpart to U.S. Appl. No. 15/765,712, pp. 1-5, Published: EP.

* cited by examiner

TDD TIMING RECOVERY IN A DISTRIBUTED ANTENNA SYSTEM

CROSS-REFERENCE TO RELATED APPLICATIONS

This application is a U.S. National Stage application of International Patent Application No. PCT/US2016/055184, filed on Oct. 3, 2016, and titled "TDD TIMING RECOVERY IN A DISTRIBUTED ANTENNA SYSTEM," which claims the benefit of U.S. Provisional Patent Application No. 62/236,870, filed on Oct. 3, 2015, and titled "TDD TIMING RECOVERY IN A DISTRIBUTED ANTENNA SYSTEM," the contents of all of which are incorporated herein by reference.

BACKGROUND

Time-division duplex (TDD) methods emulate full duplex communication over a half-duplex communication link. In particular, signals that are communicated from a first device to a second device occur on the same frequencies as, but at a different time than signals communicated from the second device to the first device. Typically, one direction of communication is referred to as the "downlink" direction (and the corresponding signals are referred to here as "downlink signals" or "downlink communications"), and the other direction of communication is referred to as the "uplink" direction (and the corresponding signals are referred to here as "uplink signals" or "uplink communications"). For example, in some systems, separate downlink and uplink timeslots or sub-frames are assigned.

Many systems use TDD for communication. For example, some implementations of the $3^{rd}$ Generation Partnership Projects (3GPP) Long Term Evolution (LTE) and the Institute of Electrical and Electronics Engineers (IEEE) 802.16 standard use TDD for communication of wireless radio frequency signals.

In order for successful communication between devices in a TDD system, the devices need to synchronize when they switch from communicating in the downlink direction to communicating in the uplink direction and when they switch from communicating in the uplink direction to communicating in the downlink direction. Otherwise, signals will be lost due to interference or missed because each device was not switched to the same signal direction.

In some applications, a distributed antenna system (DAS) is used to relay signals between a first device and a second device in a TDD application. Such DASs, however, typically do not demodulate and decode the RF signals that they distribute. Thus, the DASs cannot determine when to switch between uplink and downlink mode based on the timing information encoded in the RF signals.

DETAILED DESCRIPTION

Figure 1:
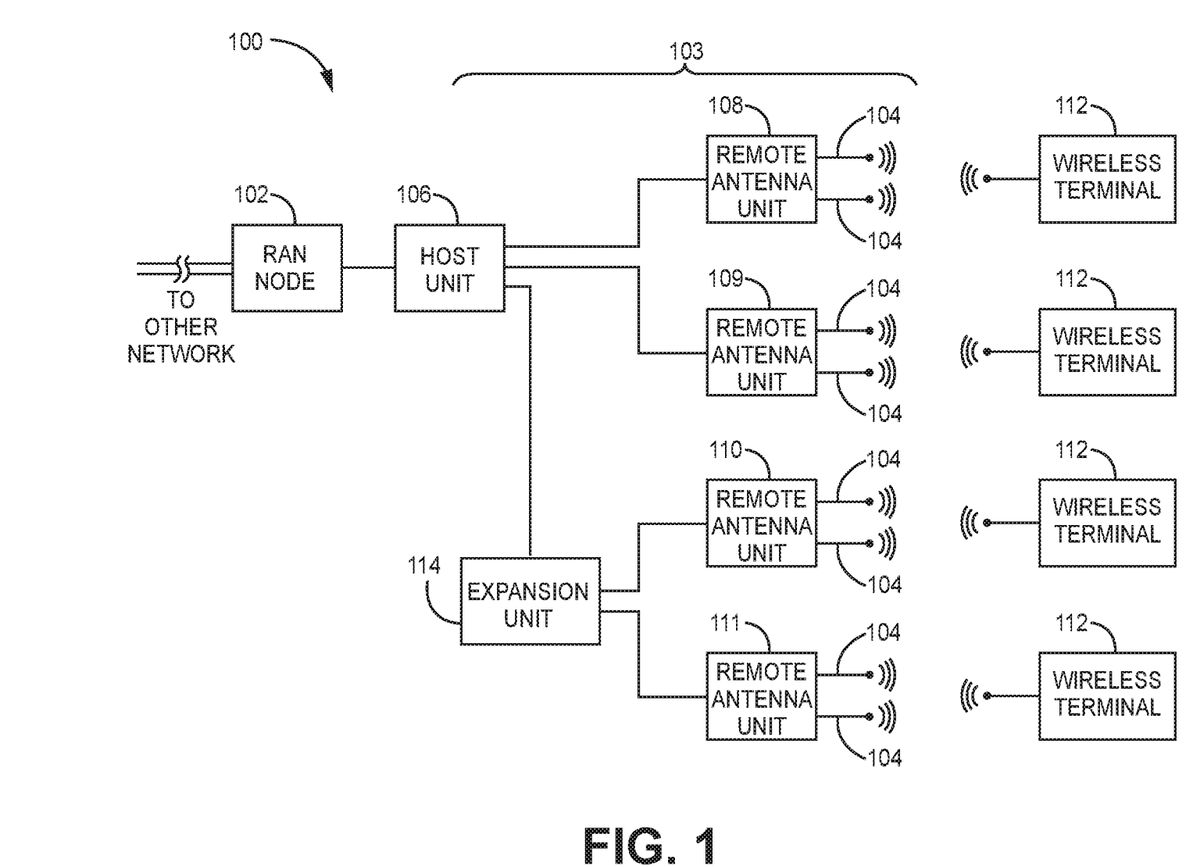
FIG. 1 is a block diagram of one embodiment of a communication system for switching between uplink and downlink transmissions.

FIG. 1 is a block diagram of one embodiment of a communication system 100. Communication system 100 is described herein as being implemented in order to distribute TDD LTE RF signals. It is to be understood, however, that other embodiments can be implemented in other ways (for example, to distribute other types of TDD RF signals, such as Wireless Broadband, WiBro, or WiMAX). As mentioned in the Background section, TDD schemes enable bi-directional communication between two devices by having uplink transmissions (from wireless terminal 112 toward radio access network (RAN) node 102) and downlink transmissions (from RAN node 102 toward wireless terminal 112) occur at different times using common frequencies.

In the embodiment shown in FIG. 1, communication system 100 comprises a RAN node 102 which is communicatively coupled to a distributed antenna system (DAS) 103. DAS 103 is used to transport communication signals between one or more upstream devices (for example, RAN node 102, wireless access points, or other sources of radio frequency signals) and one or more downstream wireless devices (for example, wireless terminals 112). In some embodiments, RAN node 102 is a part of a telecommunication-service providers' infrastructure and wireless terminals 112 comprise customer premise equipment. RAN node 102 is an RF source that performs baseband processing such as a baseband unit, a base station (e.g., eNodeB), or base transceiver station (BTS), for example. For simplicity, a single RAN node 102 is often referred to herein, however, it should be understood that, in some embodiments, the interactions described herein can be performed with multiple RAN nodes 102. The RF source can be a standalone unit or can be implemented as part of a centralized/cloud RAN configuration where multiple baseband units are implemented at a centralized location.

DAS 103 comprises a host unit 106 communicatively coupled to remote antenna units (RAUs) 108-109. In this embodiment, DAS 103 also includes an expansion unit 114 communicatively coupled between host unit 106 and RAUs 110, 111 to expand the range of host unit 106. Each remote antenna unit 108-111 is coupled to one or more antennas 104 which are used to communicate wirelessly with wireless terminals 112. In this embodiment, each of remote antenna units 108-111 is coupled to two antennas 104. In other embodiments, other numbers of antennas 104 are used. Although in this embodiment a certain number of remote antenna units 108-111 and expansion units 114 are coupled to host unit 106, in other embodiments other numbers of remote antenna units 108-111 and expansion units 114 are coupled to host unit 106. Also, other DAS topologies can be used. For example, one or more host units can be daisy chained together. Also, one or more RAUs can be daisy chained together. Also, the daisy chains can form rings as well as non-ring topologies.

As shown in FIG. 1, host unit 106 is coupled to RAUs 108-111 and expansion unit 114 through bi-directional point-to-point communication links. In an embodiment, communication links comprise fiber optic cables. In other embodiments, however, other communications means such as but not limited to co-axial cables, twisted pair cables (e.g., CAT-5, CAT-6 cables), or microwave communication links may be utilized in various combinations.

Host unit 106 is communicatively coupled to one or more upstream devices (such as one or more RAN nodes 102 or wireless access points). In some embodiments, host unit 106 is coupled to the one or more upstream devices via a physical communication medium. In other embodiments, host unit 106 is communicatively coupled to the one or more upstream devices in other ways (for example, using one or more donor antennas and one or more bi-directional amplifiers or repeaters). In an embodiment, RAN node 102 comprises an eNodeB.

DAS 103 distributes communication signals between wireless terminals 112 and RAN node 102. Wireless terminals 112 transmit/receive signals to/from remote antenna units 108-111 via remote antennas 104.

In the downlink direction, DAS 103 operates as a point-to-multipoint transport for signals from one or more RAN nodes 102 to one or more wireless terminals 112. Downlink RAN signals are received by DAS 103 at host unit 106 from the RAN node 102. The DAS 103 generates transport signals based on the downlink RAN signals and sends the transport signals to each of the RAUs 108-111. In an example, each of the RAUs 108-111 in DAS 103 receive identical transport signals. In other examples, one or more subsets of the RAUs 108-111 receive different transport signals. Each RAU 108-111 converts the transport signal from the host unit 106 into an analog RF waveform and transmits the RF waveform to one or more of the wireless terminals 112 as an over-the-air modulated RF signal. Each RAU 108-111 includes a digital-to-analog converter (DAC) (in digital implementations) and radiohead hardware to perform the operations for producing the analog modulated RF waveform from the received transport signal and amplifying the analog modulated RF waveform for broadcast as an over-the-air RF signal.

In the uplink direction, each of the RAUs 108-111 senses one or more RF signals from one or more wireless terminals 112 and generates a respective uplink transport signal based on the one or more RF signals. The RAUs 108-111 send their respective transport signals to the host unit 106, and the host unit 106 aggregates the information from the transport signals to provide a unified RAN signal to the RAN node 102.

The RAN signals communicated between the RAN node 102 and DAS 103 (i.e., between the RAN node 102 and host unit 106) can be modulated analog signals or signals including digital samples corresponding to a modulated analog signal. The analog signals can be intermediate frequency (IF) or radio frequency (RF) signals. The digital samples can include samples corresponding to a baseband, intermediate frequency (IF), or radio frequency (RF) version of the RF signals. The baseband samples can be complex I/Q samples and the IF and RF samples can be real samples. The signals including digital samples corresponding to an analog modulated signal can conform to a RAN node communication protocol such as the Common Public Radio Interface (CPRI), Open Base Station Architecture Initiative (OBSAI), or Open Radio Equipment Interface (ORI).

In a digital DAS example, the transport signals sent between the host unit 106 and the RAUs 108-111 include digital samples corresponding to the modulated analog wireless signals sent and received between the RAUs 108-111 and the wireless terminals 112. In the downlink of such an example, the transport signal is a serial data stream including the digital samples. The digital samples can include samples corresponding to a baseband, intermediate frequency (IF), or radio frequency (RF) version of the modulated analog signals. The baseband samples can be complex I/Q samples and the IF and RF samples can be real samples.

In a first implementation of a digital DAS example, the signals communicated between the host unit 106 and the RAN node 102 are modulated analog RF signals. In the downlink of this first implementation, the host unit 106 receives a modulated RF signal from the RAN node 102, down converts the RF signal to IF, digitizes (A/D converts) the IF signal to produce real digital IF samples, digitally down-converts the real digital IF samples to produce I/Q (complex) samples, and incorporates the I/Q samples into a downlink transport signal. In some embodiments, the I/Q samples are resampled. In some embodiments, any of the analog signals or digital samples can be filtered to select only a portion of the original bandwidth for transport. In the uplink of this first implementation, the host unit 106 receives an uplink transport signal from one more RAUs 108-111, extracts the I/Q samples therefrom, digitally up-converts the I/Q samples to produce real digital IF samples, D/A converts the real digital IF samples to a modulated analog IF signal, up-converts the analog IF signal to an RF signal and sends the RF signal to the RAN node 102. In some embodiments, digital samples from respective transport signals can be digitally summed to form unified data for the RAN node 102.

In a second implementation of the digital DAS example, the signals communicated between the host unit 106 and the RAN node 102 carry digital I/Q samples corresponding to a modulated analog signal. In the downlink of this second implementation, the host unit 106 receives a signal from the RAN node 102 including digital I/Q samples (e.g., a CPRI signal) and incorporates the digital I/Q samples into a downlink transport signal to the RAUs 108-111. In some embodiments, the I/Q samples are resampled. In some embodiments, the digital samples can be filtered to select only a portion of the original bandwidth for transport. In the uplink of this second implementation, the host unit 106 receives an uplink transport signal from one or more RAUs 108-111, extracts I/Q samples therefrom, and sends the I/Q samples to the RAN node 102 (e.g., in a CPRI signal). In some embodiments, digital samples from respective transport signals can be digitally summed to form unified data for the RAN node 102.

In any case, in a digital DAS example, the transport signals carry packets of digital samples corresponding to a modulated electromagnetic radio-frequency waveform.

In an analog DAS example, the transport signals between the host unit 106 and the RAUs 108-111 include a modulated analog IF signal. In such an example, the host unit 106 can send and receive modulated analog RF signals with the host unit 106. The host unit 106 can convert between the modulated RF signals and modulated analog IF signals, which are transported between the host unit 106 and RAUs 108-111.

In some examples, DAS 103 can be an analog and digital DAS and transport both signals including digital samples and analog modulated IF signals concurrently.

The RAUs 108-111 perform similar conversions for digital and analog DAS functions respectively. In the uplink of a digital DAS example, a RAU 108 senses a modulated wireless RF signal via an antenna, down converts the RF signal to IF, digitizes (A/D converts) the IF signal to produce real digital IF samples, digitally down-converts the real digital IF samples to produce I/Q (complex) samples, and incorporates the I/Q samples into a downlink transport signal. In some embodiments, the I/Q samples are resampled. In some embodiments, any of the analog signals or digital samples can be filtered to select only a portion of the original bandwidth for transport. In the downlink of this digital DAS example, the RAU 108 receives an uplink transport signal from the host unit 106, extracts the I/Q samples therefrom, digitally up-converts the I/Q samples to produce real digital IF samples, D/A converts the real digital IF samples to a modulated analog IF signal, up-converts the analog IF signal to an RF signal, amplifies and radiates a wireless RF signal to one or more wireless terminals 112.

In an analog DAS example, the RAUs 108-111 can convert between modulated RF wireless signals to/from wireless terminals 112 and modulated analog IF signals, which are transported between the host unit 106 and RAUs 108-111.

In any case, for both uplink and downlink communications, the components of DAS 103 (host unit 106, expansion unit 114, and remote antenna units 108-111) do not demodulate, decode, or deframe the signals transmitted by RAN node 102 and wireless terminals 112.

Figure 2:
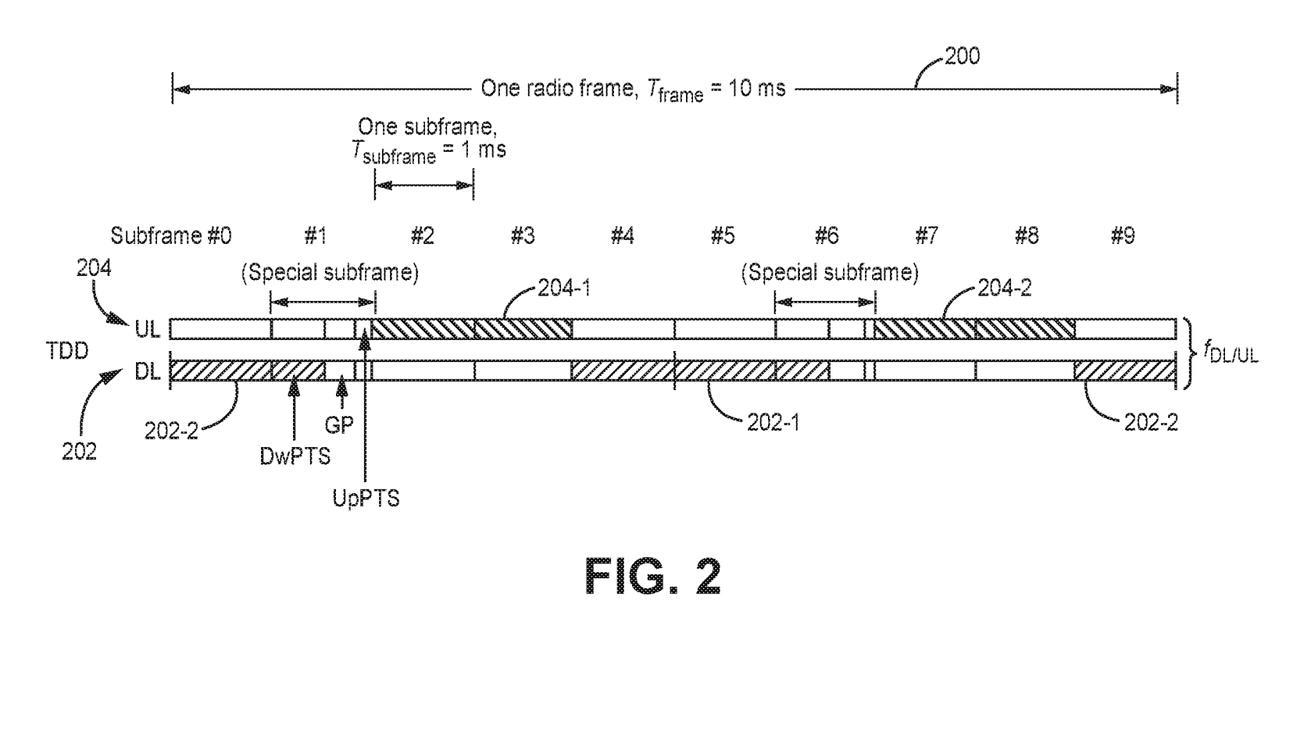
FIG. 2 is a diagram of one embodiment of a time division duplex (TDD) frame for use in the communication system of FIG. 1

FIG. 2 illustrates one example of a TDD transmission frame 200 for use with system 100. Frame 200 comprises one or more downlink (DL) bursts 202 and one or more uplink (UL) bursts 204. During each downlink burst 202, downlink signals are communicated from RAN node 102 to wireless terminals 112. During each uplink burst 204, uplink signals are communicated from wireless terminals 112 to RAN node 102.

In this embodiment, the structure of the TDD frame 200 is static for a given channel in system 100. That is, each TDD frame 200 for a given channel in system 100 has the same duration and the same number of downlink and uplink bursts having the same position and length within their respective frame 200. The example TDD frame 200 shown in FIG. 2 is an example TDD LTE frame. Accordingly, the following discussion is specific to a TDD LTE frame. It should be understood, however, that other TDD frames can be used. The TDD frame 200 has a 10 ms duration and includes 10 subframes having a 1 ms duration. The TDD frame 200 includes two downlink bursts 202-1, 202-2 and two uplink bursts 204-1, 204-2. A first downlink burst 202-1 starts at the beginning of subframe #4 (4 ms after the start of frame 200) and continues into subframe #6. A second downlink burst 202-2 starts at the beginning of subframe #9 (9 ms after the start of frame 200), continues into the next frame 200, and ends within subframe #1 of the next frame 200. A first uplink burst 204-1 starts at the beginning of subframe #2 (2 ms after the start of frame 200) and continues to the end of subframe #3). A second uplink burst 204-2 starts at the beginning of subframe #7 (7 ms after the start of frame 200) and continues to the end of subframe #8).

As used herein a "burst" is a portion of a TDD signal in which the TDD signal is continuous in the same direction. Thus, a downlink burst is a continuous downlink portion of the TDD signal and an uplink burst is a continuous uplink portion of the TDD signal. A continuous portion can have any structure, including one or more subframes as shown in FIG. 2.

In LTE TDD, each (non-special) downlink subframe (e.g., subframes #0, 4, 5, and 9 of FIG. 2) begins with a header/pilot time slot (DwPTS) followed by signal corresponding to payload data which extends to the end of the subframe. If adjacent (non-special) subframes are allocated to downlink signals, the TDD signal over those multiple subframes will include a header or pilot time slot at the beginning of each subframe. There is no guard period between adjacent downlink subframes. Accordingly, the downlink signal will be continuous across the adjacent downlink subframes since the signal containing payload data of a first downlink subframe will extend until the header or pilot time slot of the subsequent downlink subframe. Moreover, in TDD LTE there is a signal present during all portions of a downlink subframe. Thus, a single burst can extend across a given subframe and across multiple adjacent downlink subframes.

Special subframes (e.g., subframes #1 and #6 of FIG. 2) start with a downlink header/pilot time slot followed by a guard period (GP) in which no downlink or uplink signals are transmitted. An uplink header/pilot time slot (UpPTS) follows the guard period and extends to the end of the special subframe. Thus, signals are not continuous across the special subframe. In TDD LTE, downlink bursts 202 end in the special subframe and uplink bursts 204 begin in a special subframe. As mentioned above, in other embodiments (e.g., in non LTE embodiments), other frame structures can be used.

The RF circuitry within DAS 103 switches between processing downlink signals and uplink signals in coordination with the downlink bursts 202 and uplink bursts 204. The RAUs 108-111 include such RF circuitry. In an example, the host unit 106 does not include any RF circuitry that switches with the downlink bursts 202 and uplink bursts 204. In other examples, however, the host unit 106 can also include switching RF circuitry.

Figure 3:
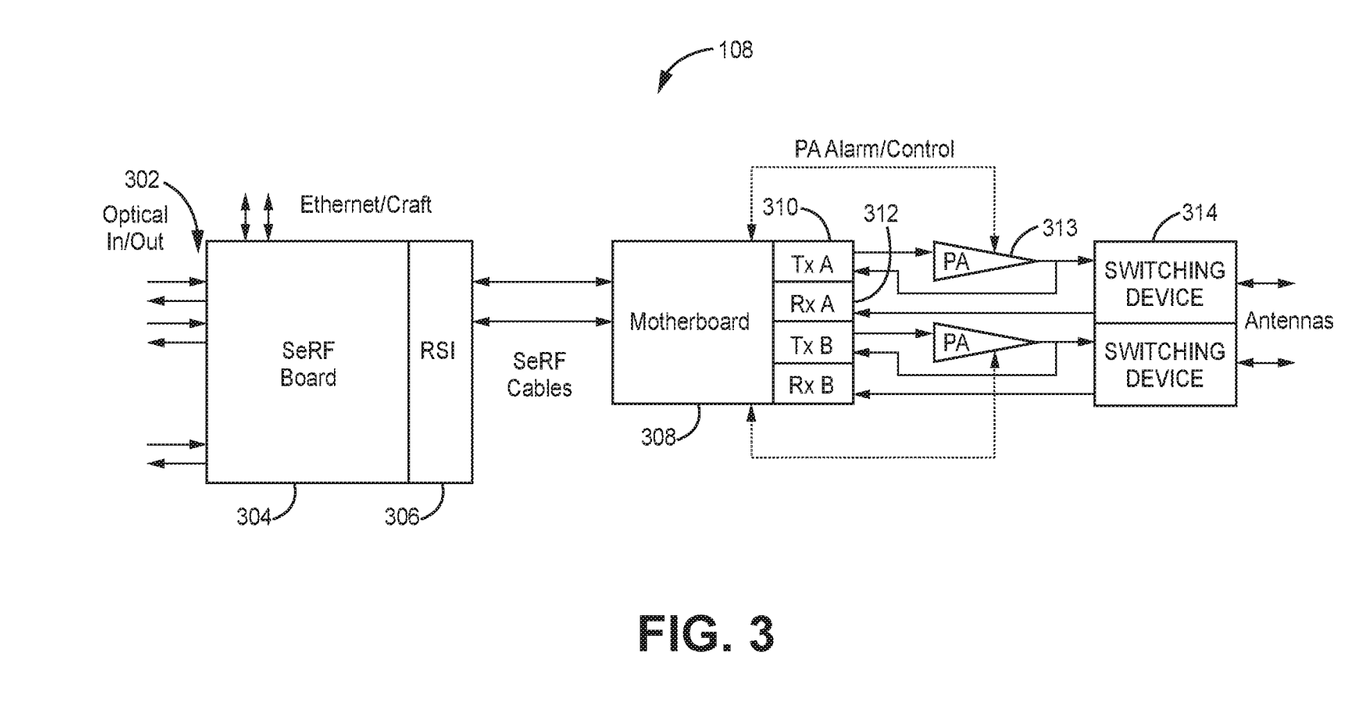
FIG. 3 is a block diagram of one embodiment of a remote antenna unit for use in the communication system of FIG. 1

FIG. 3 is a block diagram of example RAU 108. RAU 108 includes one or more transport signal input/output ports 302 for sending and receiving transport signals with the host unit 106. In the example shown in FIG. 3, the I/O ports 302 are optical ports for sending and receiving optical transport signals. In an example, the transport signals carry I/Q (complex) digital samples of a TDD signal. In an example, I/Q samples can be transported according to a serialized RF (SeRF) protocol used by ADC Telecommunications, Inc. (part of Commscope, Inc.) Shakopee, Minn. In other embodiments, the I/Q samples can be transported using other transport protocols.

A first one or more processing devices 304 can be configured to receive downlink transport signals and send uplink transport signals over the I/O ports 302. The first one or more processing devices 304 can include a general purpose processor (GPP) or special purpose computer or processor (such as a field-programmable gate array (FPGA), application-specific integrated circuit (ASIC) or other integrated circuit), or any programmable logic device. In this example, the first one or more processing devices 304 are disposed on a first circuit board (SeRF board). In some examples, the SeRF board is commercially available from TE Connectivity as part of the FlexWave™ line of products. The SeRF board and SeRF protocol are also described in U.S. patent application Ser. No. 11/627,251, assigned to ADC Telecommunications, Inc., published in U.S. Patent Application Publication No. 2008/0181282, and incorporated herein by reference. The first one or more processing devices 304 can be configured to generate uplink transport signals having uplink I/Q samples incorporated therein, and extract downlink I/Q samples from downlink transport signals. The uplink I/Q samples correspond to the uplink portion of a TDD signal and the downlink I/Q samples correspond to the downlink portion of the TDD signal. Although only the first one or more processors 304 are discussed herein, it should be understood that addition components can be included on the SeRF board to implement the functionality described herein.

The I/Q samples are communicated between the first one or more processing devices 304 and one or more RF system processors 308 over a radio system interface (RSI) 306. The one or more RF system processors 308 are configured to bi-directionally convert between I/Q samples and modulated analog signals for interaction with the transmitter(s) 310 and receiver(s) 312. In an example, the one or more RF system processors 308 are configured to digitally up-convert downlink I/Q samples to real digital IF samples and to digital to analog convert the IF samples to a modulated analog IF signal which is provided to the transmitter(s) 310. The one or more RF system processors 308 can also be configured to analog to digital convert an uplink modulated analog IF signal from the receiver(s) 312 to generate real digital IF samples and to digitally down-convert the IF samples into I/Q samples. In an example, the one or more RF system processors 308 can also be configured to recover the timing of the TDD signal as described below. The one or more RF system processors 308 can include a general purpose processor (GPP) or special purpose computer or processor (such as a field-programmable gate array (FPGA), application-specific integrated circuit (ASIC) or other integrated circuit), or any programmable logic device. In this example, the one or more RF system processors 308 are disposed on a second circuit board (motherboard). Although only the RF system processors 308 are discussed herein, it should be understood that addition components can be included on the motherboard to implement the functionality described herein The transmitter(s) 310 can be configured to up-convert the downlink modulated analog IF signal to RF. The receiver(s) 312 can be configured to down-convert an uplink modulated analog RF signal to generate an uplink modulated analog IF signal for the one or more RF system processors 308. In some embodiments, each transmitter 310-receiver 312 pair 202 is implemented with a Digital/Analog Radio Transceiver (DART board) commercially available from ADC Telecommunications, Inc. (now part of Commscope, Inc.) of Shakopee, Minn. as part of the FlexWave™ Prism line of products. Each DART board can be a separate circuit board from the motherboard that is configured to plug into a port (e.g., via an edge connector) of the motherboard. The DART board is also described in U.S. patent application Ser. No. 11/627,251, assigned to ADC Telecommunications, Inc., published in U.S. Patent Application Publication No. 2008/01101482, and incorporated herein by reference.

A power amplifier 313 can be configured to amplify the downlink modulated RF signal for transmission. A switching device 314 can be included for each band operated on by the RAU 108 to selectively couple downlink RF signals to the antenna(s) 104 and to selectively couple uplink RF signals from the antenna(s) 104 to the receiver 312. In an example, the switching device 314 has two settings, a downlink setting in which the switching device is set to couple the downlink RF signal to the antenna and isolate the downlink RF signal from the receiver 312 and an uplink setting in which the switching device is set to couple the uplink RF signal from the antenna to the receiver 312 and to isolate the uplink RF signal from the transmitter 310.

As described above, the RAU 108 includes a downlink path and an uplink path. The downlink path includes a logical portion comprising the processing of the downlink digital samples (e.g., the I/Q and IF samples) and an analog portion comprising the generation of the RF modulated signal from the downlink digital samples. Likewise, the uplink path includes an analog portion comprising the generation of an analog IF signal from a sensed RF signal at antenna(s) 104 and a logical portion comprising the processing of the IF signal to generate uplink digital samples (e.g., the I/Q and IF samples). In examples where the RAU 108 operates on multiple TDD RF signals concurrently (e.g., multiple bands), a downlink path and uplink path exists for each TDD RF signal.

In an example, the RAU 108 has an uplink mode and downlink mode for each set of downlink and uplink paths. In the uplink mode, one or more of the components are set to enable operation on the uplink signals. For example, the switching device 314 is set to couple RF signals from the antenna(s) 104 to the receiver 312, and the receiver 312 can be enabled. Additionally, in the uplink mode, one or more of the components not used to process uplink signals can be disabled, such as the transmitter 310 and power amplifier 313. Similarly, in the downlink mode, one or more of the components are set to enable operation on the downlink signals. For example, switching device 314 is set to couple the RF signals from the transmitter 310 to the antenna(s) 104, and the transmitter 310 and power amplifier 313 are enabled. Additionally, in the downlink mode, one or more components not used to process downlink signals can be disabled, such as the receiver 312.

Wireless terminals 112 obtain the timing of the downlink bursts 202 and uplink bursts 204 by decoding downlink signals sent by RAN node 102. In particular, the downlink signals include timing information indicating when each downlink burst 202 and uplink burst 204 begins and the duration of each. The DAS 103, however, does not demodulate and decode the signals transmitted between RAN node 102 and wireless terminals 112. Thus, DAS 103 independently determines the start time of the downlink bursts 202 and uplink bursts 204 in order to accurately switch between uplink mode and downlink mode.

Figure 4:
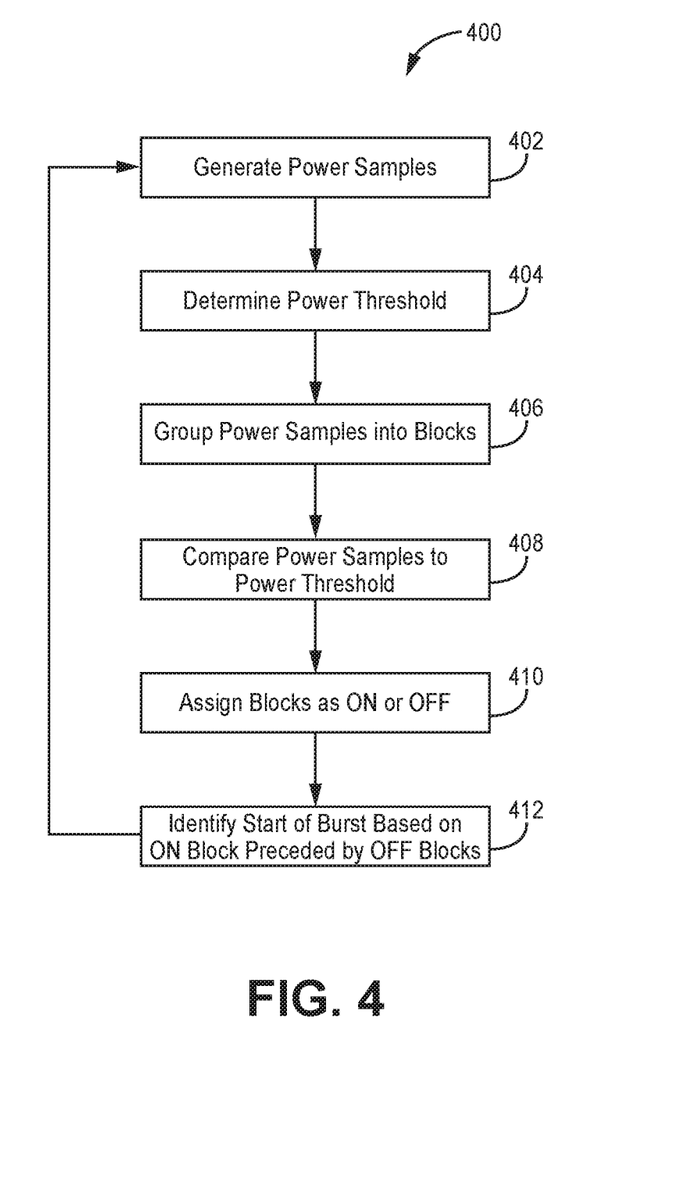
FIG. 4 is a flow diagram of one embodiment of a method of determining timing for a TDD signal in a distributed antenna system (DAS) in the communication system of FIG. 1.

FIG. 4 is an example method 400 implemented by the DAS 103 to determine the start time of the downlink bursts 202 and uplink bursts 204 in a TDD frame 200. In an example, each RAU 108-111 implements method 400 to determine when to switch its RF circuitry. In other examples, one or more "master" RAUs 108-111 implement the method 400 to determine the timing information, and communicate the timing information to the other RAUs 108-111. In yet other examples, the host unit 106 implements the method 400 to determine the timing information and communicates the timing information to the RAUs 108-111.

Method 400 is implemented by one or more processing devices. The one or more processing devices can include a general purpose processor (GPP) or special purpose computer or processor (such as a field-programmable gate array (FPGA), application-specific integrated circuit (ASIC) or other integrated circuit), or any programmable logic device. Any of the processors described above may include or function with software programs, firmware or other computer readable instructions for carrying out various methods, process tasks, calculations, and control functions, used in the digital processing functionality described herein. These instructions are typically stored on any appropriate computer readable medium used for storage of computer readable instructions or data structures. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless like. In examples where one or more of the RAUs 108-111 implements method 400, the one or more RF system processors 308 of the RAUs 108-111 can implement the method 400 along with suitable processor readable media and/or instructions, if desired.

For simplicity a single processing device is referred to in the following discussion. It should be understood, however, that one or more processing devices can be used to implement method 400. Implementing method 400, a processing device determines the start time of downlink bursts 202 and uplink bursts 204 by analyzing power samples of a downlink portion of a TDD signal. As discussed with respect to FIG. 3, a RAU 108-111 includes a downlink path separate from an uplink path. The downlink path includes samples of the downlink portion of a TDD signal. The samples in the downlink path do not include the uplink portion of the TDD signal. Thus, at time periods allocated to uplink bursts, the samples in the downlink path (ideally) include only noise.

In an example, the samples in the downlink path are I/Q samples of the downlink portion of the TDD signal. The processing device can generate power samples (block 402) from the I/Q samples by squaring the I/Q samples. Power samples are samples in which the magnitude of the data therein corresponds to the magnitude of the power in the corresponding TDD signal. In examples where the samples in the downlink path are other than I/Q samples, the processing device can take the appropriate steps, if any, to generate power samples therefrom.

The processing device can then determine a power threshold (block 404) from the power samples. In an example, the power threshold is determined by grouping power samples into blocks, wherein each block corresponds to a respective time period of the downlink portion of the TDD signal (also referred to herein as "downlink TDD signal"). In an implementation of this example, each block is a contiguous time period, such that all time periods of the downlink TDD signal are captured in a respective block and there is no overlap of adjacent (in TDD signal time) blocks. In an example, each block corresponds to 10 ms of TDD signal time, such that each block includes one frame's worth of power samples. In another example, each block corresponds to the minimum length of time of a downlink burst in the TDD signal. The minimum length of time can be set in any appropriate manner such as being based on the communication protocol or based on the known minimum length of the downlink burst in the given configuration. In the LTD TDD protocol, the minimum length of a downlink burst is 1 ms, the length of subframe.

The processing device can then generate a set of maximum power values, wherein each maximum power value is a representation of a maximum power level for a respective block. The maximum power value for a block can be represented in different manners. In an example, the power sample having the largest value is selected as the maximum power value for a respective block. In another example, the maximum power value can be an estimation of the power of the largest power symbol within the block. This estimation can be obtained by filtering the power samples for the block with a moving average filter having a time period corresponding to a length of a symbol in the TDD signal. This will generate a set of filtered values for the block. The largest filter value from the set can be selected as the maximum power value for the block. In other example, other manners of representing the maximum power level for a block can be used.

In any case, once a maximum power level for each block is obtained, an average power can be calculated from the set of maximum power levels. The power threshold can then be set based on the average power. In other examples, the power threshold can be an a priori value that is manually input.

The processing device compares the power samples of the downlink TDD signal to the power threshold in order to identify the start of a downlink burst. Since the downlink TDD signal does not include the power from the uplink portion of the TDD signal, the power level of the downlink TDD signal should increase substantially at the start of a downlink burst and maintain a power level above a noise floor until the end of the downlink burst. By comparing the power samples of the downlink TDD signal with the power threshold, the processing device can identify the start of a downlink burst in the downlink TDD signal.

In order to accurately identify the start of a downlink burst in the downlink TDD signal, the power threshold should be set above the noise floor of the downlink TDD signal and below a minimum (expected) power level of the downlink burst. In an example, the power threshold is set at a value of one of at least 10 dB, at least 6 dB, or at least 3 dB less than the average power determined above. In an implementation of this example, the power threshold is set at a value of 30 dB less than the average power.

In another example, the noise floor of the downlink TDD signal during an uplink burst is estimated, and the power threshold is set at a value between the average power and the noise floor. The noise floor can be estimated by filtering the power samples of the downlink TDD signal with a moving average filter having a time period that is slightly less than the minimum length of an uplink burst in the TDD signal. The minimum length of an uplink burst can be set in any appropriate manner such as being based on the communication protocol or based on the known minimum length of the uplink burst in the given configuration. In the LTD TDD protocol, the minimum length of an uplink burst is 1 ms, the length of subframe. In an implementation of this example, the time period for the moving average filter is set at between 10 and 100 percent of the minimum length of an uplink burst. Filtering the power samples can produce a set of filtered values. In an example, set of filtered values includes values corresponding to the length of a frame 200 (e.g., 10 ms). The minimum of the set of filtered values can be selected as the noise floor estimate for the downlink TDD signal.

In an example, to determine where between the noise floor and the average power the power threshold should be set, a noise variance of the downlink TDD signal during an uplink burst time period can be estimated. For example, the noise variance can be estimated from the set of power samples that were used by the filter to generate the filtered value that was selected as the noise floor estimate. The noise variance can be used to calculate an offset from the estimated noise floor. For example, the offset can be 2, 3, or 4 sigma with respect to the estimated noise floor. The power threshold can then be set at the noise floor plus the offset.

In any case, the processing device can compare power samples of the downlink TDD signal to the power threshold to determine a start of a downlink burst. In order to reduce the effect of a random spike in power and to reduce the processing required, the power samples of the downlink TDD signal are grouped into blocks (block 406). In an example, each block corresponds to a respective time period of the downlink TDD signal. In an implementation of this example, each block is a contiguous time period, such that all time periods of the downlink TDD signal are captured in a respective block and there is no overlap of adjacent (in TDD signal time) blocks. In an example, each block is less than $\frac{1}{500}^{th}$ the minimum length of a downlink burst in the TDD signal. In an implementation of this example, each block includes at least 10 samples. In a particular implementation, each block corresponds to 260 nanoseconds of the downlink TDD signal.

The power samples in each block are compared to the power threshold (block 408). Based on the comparison of the samples in each block to the power threshold, each block is assigned as ON or OFF (block 410). ON is used to represent a block in which a downlink signal is present and OFF is used to represent a block in which a downlink signal is not present. If a threshold number of samples in a given block are above the power threshold, the block is assigned as ON. Otherwise, the block is assigned as OFF. In an example, the threshold number of samples is 10 percent of the samples in a block. In an implementation of this example, the threshold number of samples is $\frac{1}{6}^{th}$ of the samples in a block.

The processing device can then identify a start of a downlink burst by identifying an ON block preceded by at least a minimum number of consecutive OFF blocks (block 412). Since time periods corresponding to the uplink portion of the TDD signal in the downlink TDD signal are (ideally) only noise, the blocks corresponding to these uplink time periods should be assigned as OFF. Thus, the minimum number of OFF blocks used to identify a start of a downlink burst can correspond to the minimum length of an uplink burst in the TDD signal. As discussed above, in an LTE TDD example, this minimum length can be 1 ms. Thus, once a number of consecutive OFF blocks corresponding to 1 ms of time are identified, the next ON block is identified as the start of a downlink burst. In this way, the start of a downlink burst can be identified by the DAS 103 based on samples of the downlink TDD signal, without demodulating and decoding the TDD signal.

Once the start of a downlink burst 202 is identified, the DAS 103 can use the start to switch one or more components between downlink mode and uplink mode. For example, the duration of each downlink burst as well as the relative start times of subsequent bursts 202, 204 with the frame 200 can be input (e.g., manually) into the DAS 103 and used to calculate the start and end of each burst 202, 204 based on the identified start of one of the downlink bursts. In examples, where multiple downlink bursts 202 are included in a frame 200, the start of each of the downlink bursts 202 may need to be identified to remove ambiguity between the downlink bursts 202. In other examples, the end of the downlink burst 202 can be determined by the one or more processing devices, for example, by identifying an OFF block following one or more ON blocks. Additionally, in some examples, a similar method to method 400 can be performed on uplink samples in the uplink path to identify a start and/or end of an uplink burst 204.

In any case, once the start of a (or multiple) downlink burst(s) 202 is identified, the end of the downlink burst(s) 202 and the start and end of the uplink burst(s) 204 can be determined. The start and end of the respective downlink burst(s) 202 and uplink burst(s) 204 can be used to set one or more components (e.g., RAU 108, switching device 314, etc.) into downlink or uplink mode respectively. In some examples, specifically timed uplink and/or downlink mode switching schemes can be used which, for example, switch/ enable/disable some components prior to other components. For example, the power amplifier 313 in the downlink path may be disabled prior to setting the switching device 314 into uplink mode to reduce the likelihood of high power signals being coupled into the uplink path.

In an example, the above process of identifying the start of a downlink burst 202 can be implemented one or a couple times during a training mode of the DAS 103/RAU 108-111 to initially find and lock onto the start of a downlink burst 202. Once locked onto the start of a downlink burst 202, the above process can end and the DAS 103/RAU 108-111 can predict the start of subsequent bursts 202/204 based on the identified start of a downlink burst 202. In such an example, other schemes can be used to maintain the burst timing.

In an alternative example, the above process of identifying the start of a downlink burst 202 can be repeated continually during steady state operation with a continually updated set of blocks (updated to correspond to a more current time) to continually identify the start of a downlink burst 202 and control the one or more components accordingly. In such an alternative example, the above process can be used to maintain the burst timing.

In an implementation of such an alternative example, the processing device can predict the start of a downlink burst 202 based on the start of one or more previous downlink bursts 202. The prediction can be based on relative timing of subsequent downlink bursts 202 (e.g., the length of time between starts of downlink bursts 202) which can, for example, be input manually. In addition to predicting the start of a subsequent downlink burst 202, the processing device can identify/observe the start of the subsequent downlink burst using the process described above. If there is a difference between the predicted start of the subsequent downlink burst 202 and the identified start of the subsequent downlink burst 202, the process device can set an adjusted start of the subsequent downlink burst 202 at a time between the predicted start and the identified start. The adjusted start of the subsequent downlink burst 202 can then be used to control the one or more components and/or for a subsequent prediction of a later downlink burst 202.

In an example, the adjusted start can be set at a second offset from the predicted start. The second offset can be selected to adjust the error in the predicted start (difference between predicted start and identified start) over multiple iterations/adjustments to reduce jitter in the adjusted start value. That is, an error of the predicted start is only partially accounted for in a given adjustment. If a subsequent determination for a subsequent downlink burst 202 indicates a further error, the error is adjusted further at that time. This iterative process continues to gradually adjust for error over multiple iterations. In an example, the second offset can be a fixed small increment of time (e.g., 1 microsecond). In another example, the second offset can be a fixed percentage of the difference between the predicted start and the identified start (e.g., 25%). In any case, tempering the adjustment of the start in this manner can reduce jitter in the adjustment, while allowing full correction of the error over multiple adjustments.

In another example, the adjusted start can be set based on integrating the difference (error) between the predicted start and the identified start over time. Other manners of accounting for the error can also be used.

Subsequent predicted starts for subsequent downlink bursts 202 can be determined based on the adjusted, predicted, and/or identified starts of one or more previous downlink bursts 202. For example, the predicted start for a given downlink bursts 202 can be based on an averaging of an adjusted start of multiple previous downlink bursts 202 while taking into account a length of time (e.g., that is manually input) between starts of downlink bursts 202.

In some examples, the process of predicting the start, identifying the start, and setting an adjusted start can be implemented during steady state operation, and a different process can be implemented during a training phase. For example, during the training phase, larger adjustments to the predicted start can be allowed. The processing device can determine when to transition out of the training phase and to steady state operation based on a threshold number of successful predicted starts, that is, a threshold number of predicted starts that are sufficiently close to the corresponding identified start. In some examples, the processing device can also determine when to transition out of steady state operation and back into the training phase based on a threshold number of predicted start being sufficiently far from the corresponding identified start. In an implementation of this example, 15 consecutive successful predicted starts can be used at the threshold to determine when to transition from the training phase to steady state operation and 4 consecutive predicted starts being sufficiently far from the identified start can be used as the threshold to determine when to transition from steady state operation to the training phase.

As indicated above, this process of predicting the start, identifying the start, and setting an adjusted start of a downlink burst 202 can be repeated continually to maintain the TDD timing over time. In an implementation of this example, the process of predicting, identifying, and adjusting can be performed for all downlink bursts 202 of the TDD signal. In another implementation of this example, the process of predicting, identifying, and adjusting can be performed for less than all (e.g., one per frame 200, one per 10 frames, etc.) of the downlink bursts 202 of the TDD signal.

Continually identifying the start of downlink bursts 202 can include continually setting the power threshold based on a continually updated set of blocks (updated to correspond to a more current time) to continually adjust the power threshold based on the updated power samples of the TDD signal. In other examples, the power threshold can be static after an initial training phase.

In some examples, other operations can be performed on the downlink samples prior to generating power samples therefrom and/or analyzing the power samples to identify a start of a downlink burst 202. For example, the downlink samples can be filtered to extract one or more specific frequencies from which the timing can be obtained. Such filtering could be used, for example, to extract a reference signal from the downlink TDD signal.

EXAMPLE EMBODIMENTS

Example 1 includes a method for determining timing for a time division duplex (TDD) signal in a distributed antenna system (DAS), the method comprising: grouping power samples of a downlink portion of the TDD signal into blocks corresponding to a respective time period; comparing power samples of the blocks to a power threshold; assigning the blocks as ON or OFF based on a number of power samples in a respective block that are above the power threshold; identifying a start of a downlink burst in the TDD signal as an ON block preceded by at least a minimum number of consecutive OFF blocks; and controlling at least one component in the DAS based on the start of the downlink burst.

Example 2 includes the method of Example 1, wherein each block corresponds to a common length of time.

Example 3 includes the method of any of Examples 1 or 2, wherein the common length of time is less than $1/500^{th}$ a minimum length of a downlink burst in the TDD signal.

Example 4 includes the method of any of Examples 1-3, wherein the common length of time corresponds to at least 10 samples.

Example 5 includes the method of any of Examples 1-4, wherein each block corresponds to a contiguous time period.

Example 6 includes the method of any of Examples 1-5, comprising: generating the power samples by squaring complex data samples.

Example 7 includes the method of any of Examples 1-6, wherein assigning the blocks as ON or OFF includes, if more than a minimum number of power samples in the respective block are above the power threshold, assigning the respective block as ON.

Example 8 includes the method of Example 7, wherein the minimum number of power samples is at least 10 percent of the power samples in the respective block.

Example 9 includes the method of any of Examples 1-8, wherein the minimum number of consecutive OFF blocks is less than or equal to a number of blocks corresponding to the minimum length of an uplink burst in the TDD signal.

Example 10 includes the method of any of Examples 1-9, comprising: continually adjusting the power threshold based on power samples of the TDD signal Example 11 includes the method of Example 10, wherein continually adjusting the power threshold includes: grouping power samples of the downlink portion of the TDD signal into second blocks corresponding to a respective time period; generating a set of maximum power values, the set of maximum power values consisting of a maximum power value for each of a contiguous set of the second blocks; calculating an average power of the set of maximum power values; and setting the power threshold based on the average power.

Example 12 includes the method of Example 11, wherein generating the set of maximum power values includes: selecting the largest power sample from each of the second blocks in the contiguous set as the maximum power value for that second block.

Example 13 includes the method of Example 11, wherein generating the set of maximum power values includes, for each of the second blocks in the contiguous set: filtering the power samples for a respective block with a moving average filter having a time period corresponding to a length of a symbol of the TDD signal to generate a set of filtered values for the respective block; and selecting the largest filtered value for the respective block as the maximum power value for the respective block.

Example 14 includes the method of any of Examples 11-13, wherein grouping the power samples includes grouping the power samples into blocks having a common length of time that is at least the minimum length of time of a downlink burst in the TDD signal.

Example 15 includes the method of any of Examples 11-14, wherein setting the power threshold includes setting the power threshold at a value at least 3 dB less than the average power.

Example 16 includes the method of any of Examples 11-15, comprising: estimating a noise floor of the downlink portion of the TDD signal during an uplink burst time period, wherein setting the power threshold includes setting the power threshold at a value between the average power and the noise floor.

Example 17 includes the method of Example 16, wherein estimating the noise floor includes: filtering power samples of the downlink portion of the TDD signal with a moving average filter having a time period that is between 10 and 100 percent of the minimum length of an uplink burst in the TDD signal to generate a plurality of second average powers; and selecting the minimum of the plurality of second average powers as the noise floor.

Example 18 includes the method of any of Examples 16-17, comprising: estimating a noise variance of the downlink portion of the TDD signal during the uplink burst time period; and calculating an offset based on the noise variance, wherein setting the power threshold includes setting the power threshold at the noise floor plus the offset.

Example 19 includes the method of any of Examples 1-18, comprising: determining the number of consecutive ON blocks from the start of the downlink burst; and if the number of consecutive ON blocks does not equal an expected duration of the downlink burst, setting an alarm.

Example 20 includes the method of any of Examples 1-19, wherein controlling at least one component includes: setting a switch from coupling a downlink path to one or more antennas to coupling an uplink path to the one or more antennas; and disabling a power amplifier in the downlink path prior to setting the switch to couple an uplink path to the one or more antennas.

Example 21 includes the method of any of Examples 1-20, comprising: continually identifying a start of respective subsequent downlink bursts in the TDD signal by identifying an ON block preceded by at least a minimum number of consecutive OFF blocks; and controlling at least one component in the DAS based on the start of the respective subsequent downlink bursts.

Example 22 includes the method of any of Examples 1-21, comprising: predicting a start of the downlink burst based on a start of one or more previous downlink bursts; if the identified start of the downlink burst is different than the predicted start of the downlink burst, setting an adjusted start for the downlink burst at a time between the predicted start and the identified start; and wherein controlling at least one component in the DAS includes switching the at least one component based on the adjusted start.

Example 23 includes the method of Example 22, comprising: continually predicting a start of respective subsequent downlink bursts in the TDD signal based on an adjusted start of one or more previous downlink bursts; continually identifying a start of the respective subsequent downlink bursts by identifying an ON block preceded by at least a minimum number of consecutive OFF blocks; continually setting an adjusted start for the respective subsequent downlink bursts at a time between the predicted start and the identified start for the respective subsequent downlink burst, if the identified start for the respective subsequent downlink burst is different than the predicted start for the respective subsequent downlink burst; and controlling at least one component in the DAS based on the adjusted start of the respective subsequent downlink bursts.

Example 24 includes the method of Example 23, wherein the continually setting an adjusted start includes one of: setting the adjusted starts at a common adjustment from their respective predicted start if the difference between their respective identified start and their respective predicted start is greater than the adjustment; and setting the adjusted starts at a second adjustment from their respective predicted start, wherein the second adjustment is a set percentage of the difference between their respective predicted start and their respective identified start, wherein the set percentage is the same for each difference that is greater than a threshold.

Example 25 includes a remote unit in a distributed antenna system (DAS), the remote unit comprising: one or more antennas for radiation of downlink signals and for sensing of uplink signals; a switch configured to selectively couple one of a downlink communication path or an uplink communication path to the one or more antennas; one or more processing devices configured to: group power samples of a downlink portion of a time division duplex (TDD) signal into blocks corresponding to a respective time period; compare power samples of the blocks to a power threshold; assign the blocks as ON or OFF based on a number of power samples in a respective block that are above the power threshold; identify a start of a downlink burst in the TDD signal as an ON block preceded by at least a minimum number of consecutive OFF blocks; and set the switch based on the start of the downlink burst.

Example 26 includes the remote unit of Example 25, wherein the one or more processing devices are configured to: generate the power samples by squaring complex data samples.

Example 27 includes the remote unit of any of Examples 25-26, wherein assign the blocks as ON or OFF includes, if more than a minimum number of power samples in the respective block are above the power threshold, assign the respective block as ON.

Example 28 includes the remote unit of Example 27, wherein the minimum number of power samples is at least 10 percent of the power samples in the respective block.

Example 29 includes the remote unit of any of Examples 25-28, wherein the minimum number of consecutive OFF blocks is less than or equal to a number of blocks corresponding to the minimum length of an uplink burst in the TDD signal.

Example 30 includes the remote unit of any of Examples 25-29, wherein the one or more processing devices are configured to: continually adjust the power threshold based on power samples of the TDD signal Example 31 includes the remote unit of Example 30, wherein continually adjust the power threshold includes: group power samples of the downlink portion of the TDD signal into second blocks corresponding to a respective time period; generate a set of maximum power values, the set of maximum power values consisting of a maximum power value for each of a contiguous set of the second blocks; calculate an average power of the set of maximum power values; and set the power threshold based on the average power.

Example 32 includes the remote unit of Example 31, wherein generate the set of maximum power values includes: select the largest power sample from each of the second blocks in the contiguous set as the maximum power value for that second block.

Example 33 includes the remote unit of Example 31, wherein generate the set of maximum power values includes, for each of the second blocks in the contiguous set: filter the power samples for a respective block with a moving average filter having a time period corresponding to a length of a symbol of the TDD signal to generate a set of filtered values for the respective block; and select the largest filtered value for the respective block as the maximum power value for the respective block.

Example 34 includes the remote unit of any of Examples 31-33, wherein group the power samples includes group the power samples into blocks having a common length of time that is at least the minimum length of time of a downlink burst in the TDD signal.

Example 35 includes the remote unit of any of Examples 31-34, wherein set the power threshold includes set the power threshold at a value at least 3 dB less than the average power.

Example 36 includes the remote unit of any of Examples 31-35, wherein the one or more processing devices are configured to: estimate a noise floor of the downlink portion of the TDD signal during an uplink burst time period, wherein set the power threshold includes set the power threshold at a value between the average power and the noise floor.

Example 37 includes the remote unit of Example 36, wherein estimate the noise floor includes: filter power samples of the downlink portion of the TDD signal with a moving average filter having a time period that is between 10 and 100 percent of the minimum length of an uplink burst in the TDD signal to generate a plurality of second average powers; and select the minimum of the plurality of second average powers as the noise floor.

Example 38 includes the remote unit of any of Examples 36-37, wherein the one or more processing devices are configured to: estimate a noise variance of the downlink portion of the TDD signal during the uplink burst time period; and calculate an offset based on the noise variance, wherein set the power threshold includes set the power threshold at the noise floor plus the offset.

Example 39 includes the remote unit of any of Examples 25-38, wherein the one or more processing devices are configured to: determine the number of consecutive ON blocks from the start of the downlink burst; and if the number of consecutive ON blocks does not equal an expected duration of the downlink burst, set an alarm.

Example 40 includes the remote unit of any of Examples 25-39, wherein control at least one component includes: set a switch from coupling a downlink path to one or more antennas to coupling an uplink path to the one or more antennas; and disable a power amplifier in the downlink path prior to setting the switch to couple an uplink path to the one or more antennas.

Example 41 includes the remote unit of any of Examples 25-40, wherein the one or more processing devices are configured to: continually identify a start of respective subsequent downlink bursts in the TDD signal by identifying an ON block preceded by at least a minimum number of consecutive OFF blocks; and control at least one component in the DAS based on the start of the respective subsequent downlink bursts.

Example 42 includes the remote unit of any of Examples 25-41, wherein the one or more processing devices are configured to: predict a start of the downlink burst based on a start of one or more previous downlink bursts; if the identified start of the downlink burst is different than the predicted start of the downlink burst, set an adjusted start for the downlink burst at a time between the predicted start and the identified start; and wherein control at least one component in the DAS includes switching the at least one component based on the adjusted start.

Example 43 includes the remote unit of Example 42, wherein the one or more processing devices are configured to: continually predict a start of respective subsequent downlink bursts in the TDD signal based on an adjusted start of one or more previous downlink bursts; continually identify a start of the respective subsequent downlink bursts by identifying an ON block preceded by at least a minimum number of consecutive OFF blocks; continually set an adjusted start for the respective subsequent downlink bursts at a time between the predicted start and the identified start for the respective subsequent downlink burst, if the identified start for the respective subsequent downlink burst is different than the predicted start for the respective subsequent downlink burst; and control at least one component in the DAS based on the adjusted start of the respective subsequent downlink bursts.

Example 44 includes the remote unit of Example 43, wherein the continually set an adjusted start includes one of: set the adjusted starts at a common adjustment from their respective predicted start if the difference between their respective identified start and their respective predicted start is greater than the adjustment; and set the adjusted starts at a second adjustment from their respective predicted start, wherein the second adjustment is a set percentage of the difference between their respective predicted start and their respective identified start, wherein the set percentage is the same for each difference that is greater than a threshold.

What is claimed is:

1. A method for determining timing for a time division duplex (TDD) signal in a distributed antenna system (DAS), the method comprising:
   grouping power samples of a downlink portion of the TDD signal into blocks corresponding to a respective time period;
   comparing power samples of the blocks to a power threshold;
   assigning the blocks as ON or OFF based on a number of power samples in a respective block that are above the power threshold;
   identifying a start of a downlink burst in the TDD signal as an ON block preceded by at least a minimum number of consecutive OFF blocks; and
   controlling at least one component in the DAS based on the start of the downlink burst.

2. The method of claim 1, wherein each block corresponds to a common length of time.

3. The method of claim 2, wherein the common length of time is less than $\frac{1}{500}^{th}$ a minimum length of a downlink burst in the TDD signal.

4. The method of claim 3, wherein the common length of time corresponds to at least 10 samples.

5. The method of claim 4, wherein each block corresponds to a contiguous time period.

6. The method of claim 1, comprising:
   generating the power samples by squaring complex data samples.

7. The method of claim 1, wherein assigning the blocks as ON or OFF includes, if more than a minimum number of power samples in the respective block are above the power threshold, assigning the respective block as ON.

8. The method of claim 7, wherein the minimum number of power samples is at least 10 percent of the power samples in the respective block.

9. The method of claim 1, wherein the minimum number of consecutive OFF blocks is less than or equal to a number of blocks corresponding to the minimum length of an uplink burst in the TDD signal.

10. The method of claim 1, comprising:
    continually adjusting the power threshold based on power samples of the TDD signal.

11. The method of claim 10, wherein continually adjusting the power threshold includes:
    grouping power samples of the downlink portion of the TDD signal into second blocks corresponding to a respective time period;

generating a set of maximum power values, the set of maximum power values consisting of a maximum power value for each of a contiguous set of the second blocks;
calculating an average power of the set of maximum power values; and
setting the power threshold based on the average power.

12. The method of claim 11, wherein generating the set of maximum power values includes:
selecting the largest power sample from each of the second blocks in the contiguous set as the maximum power value for that second block.

13. The method of claim 11, wherein generating the set of maximum power values includes, for each of the second blocks in the contiguous set:
filtering the power samples for a respective block with a moving average filter having a time period corresponding to a length of a symbol of the TDD signal to generate a set of filtered values for the respective block; and
selecting the largest filtered value for the respective block as the maximum power value for the respective block.

14. The method of claim 11, wherein grouping the power samples includes grouping the power samples into blocks having a common length of time that is at least the minimum length of time of a downlink burst in the TDD signal.

15. The method of claim 11, wherein setting the power threshold includes setting the power threshold at a value at least 3 dB less than the average power.

16. The method of claim 11, comprising:
estimating a noise floor of the downlink portion of the TDD signal during an uplink burst time period,
wherein setting the power threshold includes setting the power threshold at a value between the average power and the noise floor.

17. The method of claim 16, wherein estimating the noise floor includes:
filtering power samples of the downlink portion of the TDD signal with a moving average filter having a time period that is between 10 and 100 percent of the minimum length of an uplink burst in the TDD signal to generate a plurality of second average powers; and
selecting the minimum of the plurality of second average powers as the noise floor.

18. The method of claim 16, comprising:
estimating a noise variance of the downlink portion of the TDD signal during the uplink burst time period; and
calculating an offset based on the noise variance,
wherein setting the power threshold includes setting the power threshold at the noise floor plus the offset.

19. The method of claim 1, comprising:
determining the number of consecutive ON blocks from the start of the downlink burst; and
if the number of consecutive ON blocks does not equal an expected duration of the downlink burst, setting an alarm.

20. The method of claim 1, wherein controlling at least one component includes:
setting a switch from coupling a downlink path to one or more antennas to coupling an uplink path to the one or more antennas; and
disabling a power amplifier in the downlink path prior to setting the switch to couple an uplink path to the one or more antennas.

21. The method of claim 1, comprising:
continually identifying a start of respective subsequent downlink bursts in the TDD signal by identifying an ON block preceded by at least a minimum number of consecutive OFF blocks; and
controlling at least one component in the DAS based on the start of the respective subsequent downlink bursts.

22. The method of claim 1, comprising:
predicting a start of the downlink burst based on a start of one or more previous downlink bursts;
if the identified start of the downlink burst is different than the predicted start of the downlink burst, setting an adjusted start for the downlink burst at a time between the predicted start and the identified start; and
wherein controlling at least one component in the DAS includes switching the at least one component based on the adjusted start.

23. The method of claim 22, comprising:
continually predicting a start of respective subsequent downlink bursts in the TDD signal based on an adjusted start of one or more previous downlink bursts;
continually identifying a start of the respective subsequent downlink bursts by identifying an ON block preceded by at least a minimum number of consecutive OFF blocks;
continually setting an adjusted start for the respective subsequent downlink bursts at a time between the predicted start and the identified start for the respective subsequent downlink burst, if the identified start for the respective subsequent downlink burst is different than the predicted start for the respective subsequent downlink burst; and
controlling at least one component in the DAS based on the adjusted start of the respective subsequent downlink bursts.

24. The method of claim 23, wherein the continually setting an adjusted start includes one of:
setting the adjusted starts at a common adjustment from their respective predicted start if the difference between their respective identified start and their respective predicted start is greater than the adjustment; and
setting the adjusted starts at a second adjustment from their respective predicted start, wherein the second adjustment is a set percentage of the difference between their respective predicted start and their respective identified start, wherein the set percentage is the same for each difference that is greater than a threshold.

25. A remote unit in a distributed antenna system (DAS), the remote unit comprising:
one or more antennas for radiation of downlink signals and for sensing of uplink signals;
a switch configured to selectively couple one of a downlink communication path or an uplink communication path to the one or more antennas;
one or more processing devices configured to:
group power samples of a downlink portion of a time division duplex (TDD) signal into blocks corresponding to a respective time period;
compare power samples of the blocks to a power threshold;
assign the blocks as ON or OFF based on a number of power samples in a respective block that are above the power threshold;
identify a start of a downlink burst in the TDD signal as an ON block preceded by at least a minimum number of consecutive OFF blocks; and
set the switch based on the start of the downlink burst.

26. The remote unit of claim 25, wherein the one or more processing devices are configured to:

generate the power samples by squaring complex data samples.

27. The remote unit of claim 25, wherein assign the blocks as ON or OFF includes, if more than a minimum number of power samples in the respective block are above the power threshold, assign the respective block as ON.

28. The remote unit of claim 27, wherein the minimum number of power samples is at least 10 percent of the power samples in the respective block.

29. The remote unit of claim 25, wherein the minimum number of consecutive OFF blocks is less than or equal to a number of blocks corresponding to the minimum length of an uplink burst in the TDD signal.

30. The remote unit of claim 25, wherein the one or more processing devices are configured to:
   continually adjust the power threshold based on power samples of the TDD signal.

31. The remote unit of claim 30, wherein continually adjust the power threshold includes:
   group power samples of the downlink portion of the TDD signal into second blocks corresponding to a respective time period;
   generate a set of maximum power values, the set of maximum power values consisting of a maximum power value for each of a contiguous set of the second blocks;
   calculate an average power of the set of maximum power values; and
   set the power threshold based on the average power.

32. The remote unit of claim 31, wherein generate the set of maximum power values includes:
   select the largest power sample from each of the second blocks in the contiguous set as the maximum power value for that second block.

33. The remote unit of claim 31, wherein generate the set of maximum power values includes, for each of the second blocks in the contiguous set:
   filter the power samples for a respective block with a moving average filter having a time period corresponding to a length of a symbol of the TDD signal to generate a set of filtered values for the respective block; and
   select the largest filtered value for the respective block as the maximum power value for the respective block.

34. The remote unit of claim 31, wherein group the power samples includes group the power samples into blocks having a common length of time that is at least the minimum length of time of a downlink burst in the TDD signal.

35. The remote unit of claim 31, wherein set the power threshold includes set the power threshold at a value at least 3 dB less than the average power.

36. The remote unit of claim 31, wherein the one or more processing devices are configured to:
   estimate a noise floor of the downlink portion of the TDD signal during an uplink burst time period,
   wherein set the power threshold includes set the power threshold at a value between the average power and the noise floor.

37. The remote unit of claim 36, wherein estimate the noise floor includes:
   filter power samples of the downlink portion of the TDD signal with a moving average filter having a time period that is between 10 and 100 percent of the minimum length of an uplink burst in the TDD signal to generate a plurality of second average powers; and
   select the minimum of the plurality of second average powers as the noise floor.

38. The remote unit of claim 36, wherein the one or more processing devices are configured to:
   estimate a noise variance of the downlink portion of the TDD signal during the uplink burst time period; and
   calculate an offset based on the noise variance,
   wherein set the power threshold includes set the power threshold at the noise floor plus the offset.

39. The remote unit of claim 25, wherein the one or more processing devices are configured to:
   determine the number of consecutive ON blocks from the start of the downlink burst; and
   if the number of consecutive ON blocks does not equal an expected duration of the downlink burst, set an alarm.

40. The remote unit of claim 25, wherein control at least one component includes:
   set a switch from coupling a downlink path to one or more antennas to coupling an uplink path to the one or more antennas; and
   disable a power amplifier in the downlink path prior to setting the switch to couple an uplink path to the one or more antennas.

41. The remote unit of claim 25, wherein the one or more processing devices are configured to:
   continually identify a start of respective subsequent downlink bursts in the TDD signal by identifying an ON block preceded by at least a minimum number of consecutive OFF blocks; and
   control at least one component in the DAS based on the start of the respective subsequent downlink bursts.

42. The remote unit of claim 25, wherein the one or more processing devices are configured to:
   predict a start of the downlink burst based on a start of one or more previous downlink bursts;
   if the identified start of the downlink burst is different than the predicted start of the downlink burst, set an adjusted start for the downlink burst at a time between the predicted start and the identified start; and
   wherein control at least one component in the DAS includes switching the at least one component based on the adjusted start.

43. The remote unit of claim 42, wherein the one or more processing devices are configured to:
   continually predict a start of respective subsequent downlink bursts in the TDD signal based on an adjusted start of one or more previous downlink bursts;
   continually identify a start of the respective subsequent downlink bursts by identifying an ON block preceded by at least a minimum number of consecutive OFF blocks;
   continually set an adjusted start for the respective subsequent downlink bursts at a time between the predicted start and the identified start for the respective subsequent downlink burst, if the identified start for the respective subsequent downlink burst is different than the predicted start for the respective subsequent downlink burst; and
   control at least one component in the DAS based on the adjusted start of the respective subsequent downlink bursts.

44. The remote unit of claim 43, wherein the continually set an adjusted start includes one of:
   set the adjusted starts at a common adjustment from their respective predicted start if the difference between their respective identified start and their respective predicted start is greater than the adjustment; and
   set the adjusted starts at a second adjustment from their respective predicted start, wherein the second adjustment is a set percentage of the difference between their respective predicted start and their respective identified start, wherein the set percentage is the same for each difference that is greater than a threshold.

* * * * *